H. G. WESLEY.
LACE MEASURING AND REREELING MECHANISM.
APPLICATION FILED OCT. 10, 1912.
1,075,453.
Patented Oct. 14, 1913.
2 SHEETS—SHEET 1.
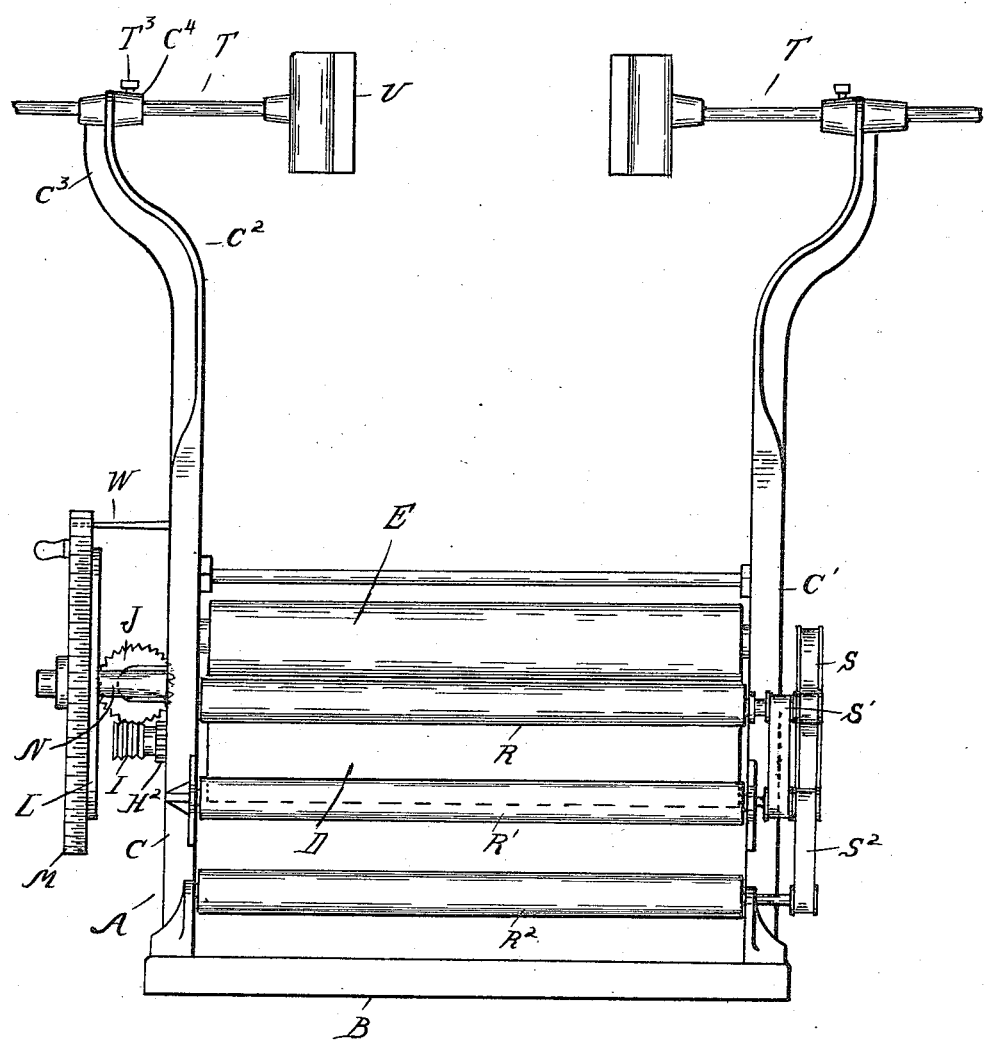
Witnesses
W. E. Ford
James P. Barry
Inventor
Harold G. Wesley
By Whittemore Hulbert & Whittemore
Atty's H. G. WESLEY.
LACE MEASURING AND REREELING MECHANISM.
APPLICATION FILED OCT. 10, 1912.
1,075,453.
Patented Oct. 14, 1913.
2 SHEETS—SHEET 2.
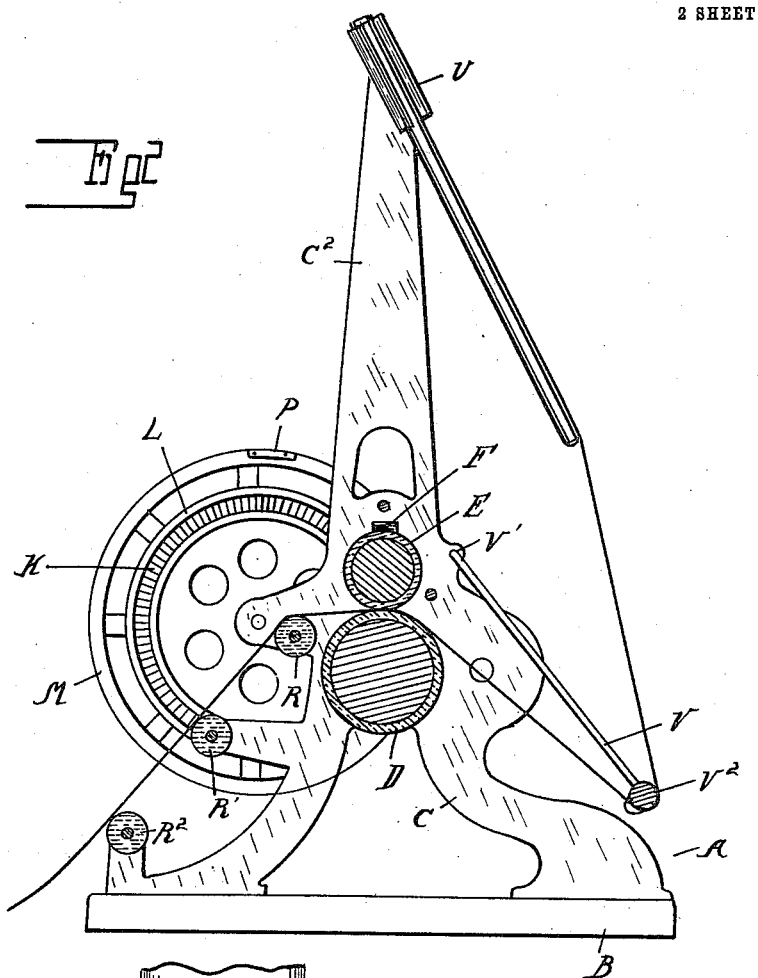
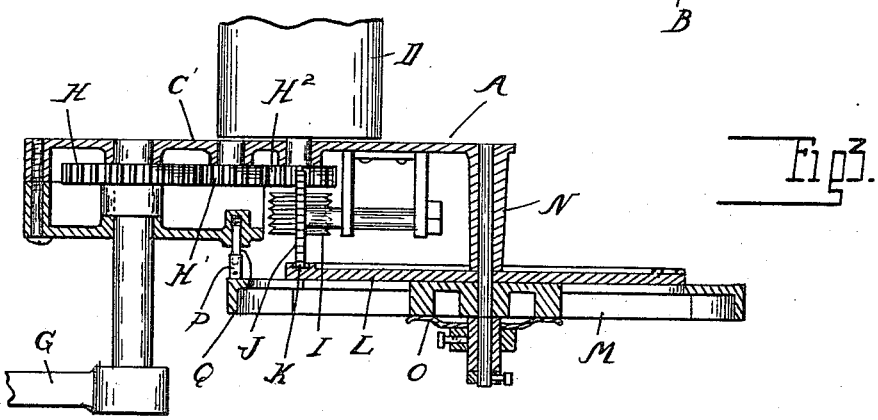

UNITED STATES PATENT OFFICE.

HAROLD G. WESLEY, OF ADRIAN, MICHIGAN.

LACE MEASURING AND REREELING MECHANISM.

1,075,453.  Specification of Letters Patent.  Patented Oct. 14, 1913.

Application filed October 10, 1912. Serial No. 724,899.

*To all whom it may concern:*

Be it known that I, HAROLD G. WESLEY, a citizen of the United States of America, residing at Adrian, in the county of Lenawee and State of Michigan, have invented certain new and useful Improvements in Lace Measuring and Rereeling Mechanism, of which the following is a specification, reference being had therein to the accompanying drawings.

The invention relates to mechanism for the measurement of fabrics, and it is the particular object of the invention to provide means for accurately measuring delicate fabrics—such as laces—without danger of injuring the same.

It is a further object to obtain a simple and effective construction, which provides for the re-reeling of the laces after measurement, as well as the measuring means.

In the drawings: Figure 1 is a front elevation of the machine. Fig. 2 is a longitudinal section therethrough. Fig. 3 is a sectional plan view of the indicating mechanism.

In the present state of the art, various machines have been devised for the measurement of cloth, ribbons and other fabrics, which are not adapted for use in connection with laces. This is for the reason that laces and other fabrics of the kind are of such delicate nature that they may be injured by a slight tension, and furthermore difficulty is encountered in the static electric-charge developed by a slight friction on the fabric, and which causes it to adhere to the measuring roll. To overcome these difficulties I have devised a construction of measuring machine, in which the lace is relieved from tension, and provision is made to prevent adhesion to the measuring roll through the static charge. I have further provided means for indicating the measurement of each piece fed through the machine, and which may be instantaneously re-set for the measurement of a succeeding piece.

In detail, A is a suitable frame, preferably comprising a base-ring B, and a pair of upright standards C and C' upon opposite sides thereof. Centrally of the standards C and C' is arranged a measuring roll D, the surface of which is preferably formed of rubber, or other resilient, yieldable material.

E is a coöperating roll in frictional contact with the roll D, and journaled in slidable bearings F in the standards C and C', which are yieldably pressed to hold the roll in frictional contact with the roll D. The roll D is positively driven from a manually operable crank G, which, as shown, is connected to the roll through the medium of a spur-gear train H H' and H². The roll is also connected with an indicating mechanism, which, as shown, consists of a worm I upon the roll shaft, connected through a gear-wheel J with an annular rack K upon a disk L. This disk is in friction contact with an indicator-wheel M, the periphery of which is marked with suitable indications of yards and inches, or other units of measurements that may be chosen. The disk L and indicator-wheel M are journaled upon a stud N projecting from the standard C, and a spring O holds them in slight frictional contact, while permitting independent movement of the indicator-wheel for re-setting. There is also a lug P upon the wheel M for engaging a stop Q on the frame for limiting the return movement in re-setting.

As has been stated, difficulty is experienced in passing a delicate lace fabric between the rolls, due to the electric charge that is developed, and which causes the fabric to adhere to the roll and to wind thereabout. To avoid this I have provided disengaging means, preferably consisting of a plurality of rolls R R' and R² which receive the outwardly-feeding end of the fabric, and which are driven at a higher speed. As shown, the shaft of the roll D has a pulley S thereon, which is belted with a step-up transmission to the shaft of the roll R, while connecting belts S' and S² serve to drive the rolls R' and R², all of which are driven at a higher peripheral speed than the roll D. This will feed the fabric upward beyond the range of attraction between the same and the roll D and will thus prevent entanglement.

Laces are usually wound upon flat pieces of cardboard or other flat bolts, from which they must be reeled when measurement is taken. I have provided means for holding the bolts, both during the reeling off of the laces therefrom, and during re-reeling, which consists of a pair of alined spindles T and T', journaled in upward extensions C² of the standards C and C'. These spindles T and T' are provided at their inner ends with clips U which clamp the ends of the cardboard or bolt. The spindles are also longitudinally adjustable to accommodate bolts of different widths, and the upper ends of the standards have offset portions C³, which permit the adjustment of said spindles to receive a bolt the full width of the roll D. One of the spindles T is adapted to receive a winding crank, which is preferably the same crank as is used for driving the roll D, and which is used for re-reeling the fabric. A sleeve T² preferably surrounds the spindle T and slidably engages the bearing C⁴ at the upper end of the offset portion C³, while a set-screw T³ serves to clamp this sleeve in the bearing in different positions of longitudinal adjustment.

In unreeling the fabric from a flat bolt, there is danger of the bolt stopping upon the dead center, or in a position where the pull on the fabric is parallel to the flat side of the bolt. This might result in injury to the fabric by undue stress on the same, and I have therefore provided means for guarding against such a result. This consists preferably of the bail V pivotally connected to lugs V' on the standard and carrying at its lower end an idler roller V². The fabric passes from the bolt around this idler roller before entering between the rolls D and E, and the arrangement is such that whenever the bolt stops on the dead center the tension on the fabric will lift the idler roll to a position where there is an angular pull on the bolt that will cause it to revolve.

In use the cardboard or bolt containing the lace to be measured is engaged with the clips U, and the spindles T and T' are adjusted to accommodate the same. The end of the fabric is then passed beneath the idler roll and into engagement with the rolls D and E, after which the indicator wheel M is set to the zero mark by turning the lug P against the stop Q. The operator then engages the crank for operating the drive train H H' and H², and revolves the rolls D and E until the entire length of fabric is drawn off from the bolt and fed through the rolls. During this operation the worm I, the worm-wheel J, disk L and indicator-wheel M will be adjusted, and at the completion of the operation the reading may be taken on said indicator wheel adjacent to an index finger W. During the feeding of the lace through the rolls D and E a static electrical-charge will be developed, but on account of the rolls R R' R², which are driven at a higher peripheral speed than the rolls D and E, the fabric is carried away from the roll D and is prevented from clinging thereto by the electrical charge.

The most delicate fabrics may be handled by this machine, as the spindles T and T' revolve with very little frictional resistance, and the only tension placed upon the fabric is that necessary to turn the bolt. After the measurement is complete the crank is disengaged from the drive train H H' H², and is engaged with the spindle T for the purpose of re-reeling the fabric upon the bolt.

What I claim as my invention is:

1. A lace or delicate-fabric measuring machine, comprising a manually-operable roll, a coöperating presser roll, and means for preventing the clinging of the fabric to said rolls through electrical attraction.

2. A lace or delicate-fabric measuring machine, comprising a measuring roll and coöperating roll between which the fabric is passed, means for manually operating said rolls, and means operating with slight tension on the fabric for disengaging the latter from said rolls.

3. A lace or delicate-fabric measuring machine, comprising a pair of driven rolls between which the fabric is passed, means operating with slight tension upon the fabric for passing the same to and disengaging it from said rolls.

4. A lace or delicate-fabric measuring machine, comprising a pair of driven rolls between which the fabric is passed, a measurement indicator operated by one of said rolls, means operating with slight tension upon said fabric for paying out the same to said rolls, and means also operating with slight tension on the fabric for disengaging the same from the rolls.

5. In a lace or delicate-fabric measuring machine, the combination with a pair of driven rolls between which the fabric is passed, of a measurement indicator operated by one of said rolls, and driven means for removing the fabric from said rolls.

6. In a lace or delicate-fabric measuring machine, the combination with a pair of driven rolls between which the fabric is passed, of a series of rolls driven at a higher peripheral speed for removing the fabric from said rolls.

7. A lace or delicate-fabric measuring machine, comprising a pair of rolls between which the fabric is passed, a worm upon the shaft of one of said rolls, a friction disk driven from said worm, an indicator-wheel in frictional contact with said disk, a lug on said wheel, and coöperating stationary stop for re-setting the indicator.

8. A lace or delicate-fabric measuring machine, comprising a frame having upright standards, a pair of rolls journaled in said standards and yieldably pressed together, means for driving one of said rolls, a worm gear indicator mechanism driven from said roll, a friction clutch between the indicator and its operating mechanism permitting of re-setting, a bolt holder journaled in the upper portion of said standards, a bail carrying a shiftable idler on one side of said rolls, connected to said standards, and driven rolls on the opposite side of said pair of rolls for removing the fabric therefrom.

In testimony whereof I affix my signature in presence of two witnesses.

HAROLD G. WESLEY.

Witnesses:
CHAS. SCHATZBERGER,
MARY A. DUNN.

Copies of this patent may be obtained for five cents each, by addressing the "Commissioner of Patents, Washington, D. C."